(12) United States Patent  
Krosnicki et al.

(10) Patent No.: US 9,299,992 B2  
(45) Date of Patent: Mar. 29, 2016

(54) ELECTROCHEMICAL REACTOR AND ACTIVE LAYER INTEGRATED INTO SAID REACTOR

(75) Inventors: Guillaume Krosnicki, Villaz (FR); Alejandro Franco, Eybens (FR); Nicolas Guillet, Chatuzange le Goubet (FR); Olivier Lemaire, Les Abrets (FR)

(73) Assignee: Commissariat A L'Energie Atomique Et Aux Energies Alternatives, Paris (FR)

(*) Notice: Subject to any disclaimer, the term of this patent is extended or adjusted under 35 U.S.C. 154(b) by 382 days.

(21) Appl. No.: 13/515,424

(22) PCT Filed: Dec. 14, 2010

(86) PCT No.: PCT/IB2010/055797  
§ 371 (c)(1),  
(2), (4) Date: Jun. 12, 2012

(87) PCT Pub. No.: WO2011/073897  
PCT Pub. Date: Jun. 23, 2011

(65) Prior Publication Data  
US 2012/0251924 A1  Oct. 4, 2012

(30) Foreign Application Priority Data

Dec. 14, 2009  (WO) .................. PCT/IB2009/055735  
Dec. 14, 2009  (WO) .................. PCT/IB2009/055738

(51) Int. Cl.  
*H01M 4/02*  (2006.01)  
*H01M 4/92*  (2006.01)  
*C25B 9/10*  (2006.01)  
*C25B 11/04*  (2006.01)

(52) U.S. Cl.  
CPC . *H01M 4/92* (2013.01); *C25B 9/10* (2013.01); *C25B 11/04* (2013.01); *Y02E 60/50* (2013.01)

(58) Field of Classification Search  
CPC ........................................................ H01M 4/92  
See application file for complete search history.

(56) References Cited

U.S. PATENT DOCUMENTS

2005/0014060 A1   1/2005  Suzuki  
2007/0158622 A1   7/2007  Lee et al.  
2007/0224479 A1*  9/2007  Tadokoro et al. ............... 429/30

FOREIGN PATENT DOCUMENTS

| CN | 1790783 A | 6/2006 |
|---|---|---|
| CN | 1978318 A | 6/2007 |
| EP | 1667271 A1 | 6/2006 |
| JP | H08-031444 | 2/1996 |
| JP | 2011076828 A | 4/2011 |
| WO | WO-03100883 A2 | 12/2003 |

(Continued)

OTHER PUBLICATIONS

State Intellectual Property Office of People's Republic of China, Notification of First Office Action in corresponding China Application No. 201080056630.0 dated May 5, 2014 (11 pages).

(Continued)

*Primary Examiner* — Helen O Conley  
(74) *Attorney, Agent, or Firm* — Harris Beach PLLC (57) ABSTRACT

The invention concerns an active layer for an electrochemical reactor comprising:—a carbon electronic conductor which is not a fullerene as a support; and—a catalytic system made up of one or more metals and a fullerene. It also concerns an electrochemical reactor integrating such an active layer.

9 Claims, 5 Drawing Sheets

1) Electrolytic reaction of water at the anode  
$2H_2O \rightarrow 4H^+ + 4e^- + O_2$ 2) Proton exchange through the membrane 3) Electron circulation in the external cicuit 4) Recombination of electrons with protons and hydrogen release at the cathode  
$4H^+ + 4e^- \rightarrow 2H_2$

(56) References Cited

FOREIGN PATENT DOCUMENTS

| WO | WO-2006041212 A1 | 4/2006 |
|---|---|---|
| WO | WO-2008129524 A1 | 10/2008 |

OTHER PUBLICATIONS

Japan Patent Office, Notice of Reasons for Rejection in corresponding Japan Application No. 2012-543969 mailed Jun. 30, 2014 (7 pages).

European Patent Office International Search Report—International Patent Application No. PCT/IB2010/055797 dated May 13, 2011 (3 pgs).

Sokolov, V.I., et al: "New Studies in Fullerene Chemistry, Platinum Metals Review", vol. 42, 1998, pp. 18-24.

Database CA (Online), Chemical Abstracts Service, Columbus, Ohio, US; Aug. 6, 2009, Shioyama, H.: "Effects of Carbon Support Surface on PEFC Performance", XP002568984, Retrived from STN Database Accession No. 151:152108 abstract & NENRYO DENCHI, 8(4), 21-25 CODEN: NDEEDV; ISSN: 1346-6623, 2009 (1 pg).

Silva, S.A.M., et al.: "Surface and Electrochemical Investigations of a Fullerene Soot", Electrochimica Acta 44 (1999) pp. 3565-3574.

Pinheiro, A., et al.: "Electrocatalysis on Noble Metal and Noble Metal Alloys Dispersed On High Surface Area Carbon", Journal of New Materials for Electrochemical Systems 6, 2003, pp. 1-8.

Franco, A., et al.: Multiscale Model of Carbon Corrosion in a PEFC: Coupling with Electrocatalysis and Impact on Performance Degradation, Journal of the Electrochemical Society, vol. 155(4), 2008, pp. B367-B384.

Franco, A., et al.: Impact of Carbon Monoxide on PEFC Catalyst Carbon Support Degradation Under Current-Cycled Operating Conditions, Electrochimica Acta 54, 2009, pp. 5267-5279.

Takenaka, S., et al.: High Durability of Carbon Nanotube-Supported Pt Electrocatalysts Covered with Silica Layers for the Cathode in a PEMFC, Journal of The Electrochemical Society, vol. 155(9), 2008, pp. B929-B936.

Metallofullerene, Wikipedia, https://en.wikipedia.org/wiki/Metallofullerene, last visited Sep. 24, 2014 (p. 1 of 1).

Lu, Xing et al., Recent progress in the chemistry of endohedral metallofullerenes,2014 Chemical Communications 50: 14701 Abstract (2 pages).

Endohedral fullerene, Wikipedia, https://en.wikipedia.org/wiki/Endohedral_fullerene, last visited Sep. 24, 2015 (5 pages).

\* cited by examiner

Fig. 1

1) Electrolytic reaction of water at the anode
$2H_2O \rightarrow 4H^+ + 4e^- + O_2$ 2) Proton exchange through the membrane 3) Electron circulation in the external cicuit 4) Recombination of electrons with protons and hydrogen release at the cathode
$4H^+ + 4e^- \rightarrow +2H_2$

ELECTROCHEMICAL REACTOR AND ACTIVE LAYER INTEGRATED INTO SAID REACTOR

CROSS-REFERENCE TO RELATED APPLICATIONS

This application is a national stage application under 35 U.S.C. §371 of PCT Application No. PCT/IB2010/055797, filed Dec. 14, 2010, which claims priority to and the benefit of International Application No. PCT/IB2009/055735, filed Dec. 14, 2009 and International Application No. PCT/IB2009/055738 filed Dec. 14, 2009, which are incorporated herein by reference in its entirety.

FIELD OF THE INVENTION

The present invention lies within the field of electrochemical reactors, particularly fuel cells, notably the "Proton Exchange Membrane Fuel Cell" (PEMFC), and proton exchange membrane electrolysers (PEM electrolysers).

It proposes a solution for improving the electrochemical performances of doped fullerene-based catalysts, as well as for reducing the corrosion phenomenon on the carbon catalyst support that occurs on the cathode of such reactors.

PRIOR ART

Figure 1:
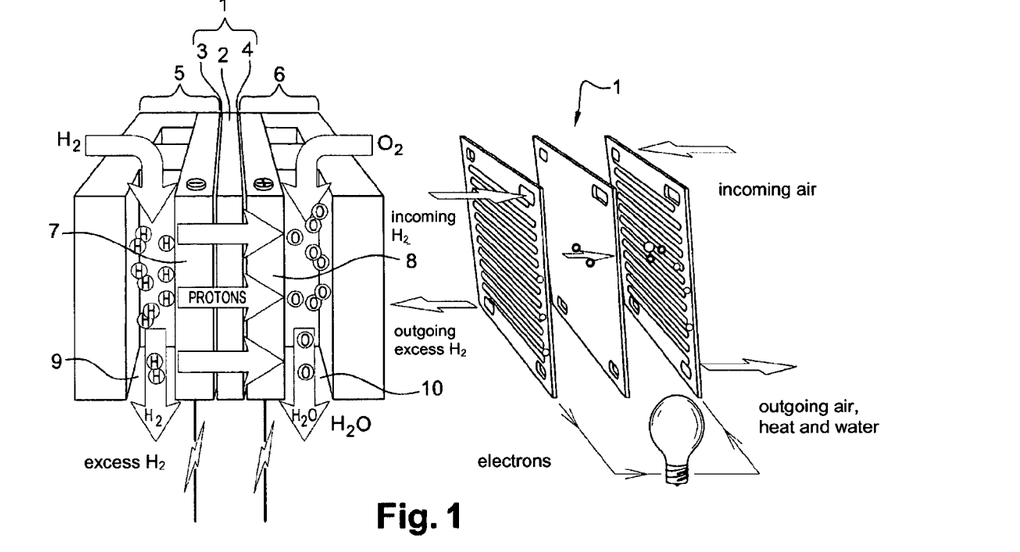
FIG. 1 represents a diagram of the operating principle for a fuel cell of the PEMFC type.

PEMFCs are current generators whose operating principle, illustrated in FIG. 1, is based on converting chemical energy into electric energy through a catalytic reaction between hydrogen and oxygen.

Membrane electrode assemblies, or MEAs 1, commonly called cell cores, comprise the basic components of PEMFCs. They are made up of a polymer membrane 2 and catalytic layers 3, 4 found on either side of the membrane and respectively comprising the anode and the cathode.

The membrane 2 is used to separate the anode 5 and cathode 6 compartments. The catalytic layers 3, 4 are generally made up of platinum nanoparticles supported by carbon aggregates, usually carbon black. Gas diffusion layers 7, 8 (carbon tissue, felt, etc.) are placed on either side of the MEA 1 to ensure electrical conduction, homogenous distribution of the reactive gases and elimination of the water produced.

On the anode 3, breakdown of the hydrogen adsorbed on the catalyst produces $H^+$ protons and $e^-$ electrons. The protons then cross the polymer membrane 2 before reacting with the oxygen at the cathode 4. The protons' reaction with the oxygen at the cathode leads to the formation of water and the production of heat.

Figure 2:
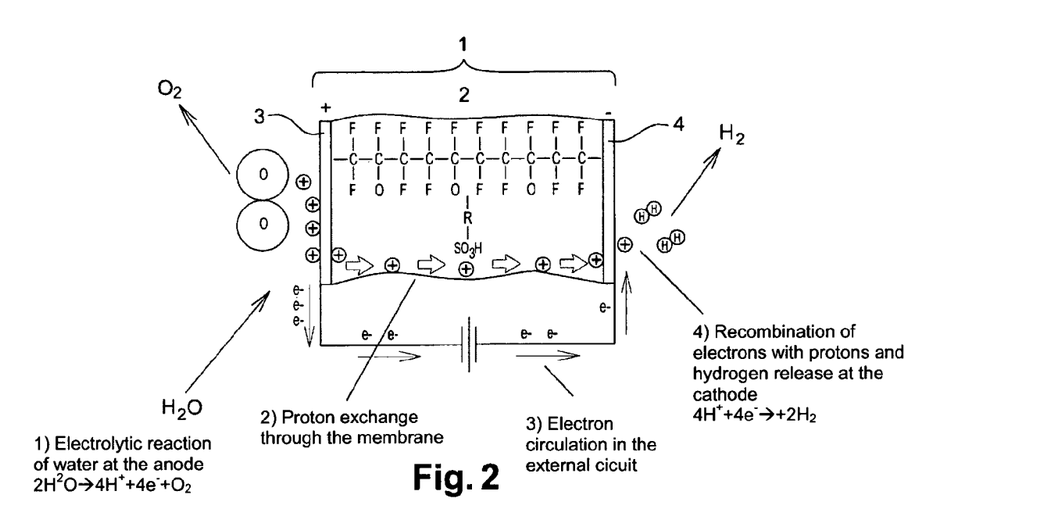
FIG. 2 represents a diagram of the operating principle for a PEM electrolyser.

PEM electrolysers, whose operating principle is illustrated in FIG. 2, are systems that are very similar to reverse PEMFCs. They are used to produce hydrogen and oxygen through a chemical transformation of water, using electric energy.

As is the case for PEMFCs, MEAs 1 are used. The components (membrane 2 and catalytic layers 3, 4) are usually of the same kind as for PEMFCs. The anode compartment is supplied with pure water. An electrical current is applied to break down the water. Oxygen is produced at anode 3, while the protons cross the membrane 2 to be recombined at cathode 4, thus producing hydrogen.

Conventionally, the catalyst used in electrochemical reactors (batteries and electrolysers) is made up of carbon black-supported platinum, in other words carbon black doped with platinum. This type of catalyst has its weaknesses, however, notably in terms of stability. That is why attempts have been made to develop other catalyst systems.

Amongst the solutions described, the use of doped fullerenes has been proposed, notably doped with platinum, or the use of fullerenes as a catalyst support in fuel cells instead of the carbon black that is commonly used.

Fullerenes are molecules in the form of a closed cage made up of an even number of carbon atoms grouped in a structure comprised of pentagons and hexagons. They are the third allotrope of carbon after graphite and diamond. Fullerenes can have different chemical species or groups on their surface. These structures may also enclose other chemical species, such as alkali, as in a cage.

Silva et al. (Electrochimica Acta 44 (1999) 3565-3574) demonstrated that doped fullerenes can be effectively used as catalysts in PEMFCs, and that their use can both reduce the metal load (notably platinum) on the electrodes and improve carbon's stability against corrosion compared with a carbon black catalyst support. Unfortunately, the electrochemical performances of doped fullerenes have proven to be inferior to those obtained with metal (platinum, for example) supported by carbon black. It should be pointed out that carbon black alone, like fullerenes alone, has very weak electrocatalytic activity.

Furthermore, Pinheiro et al. (J. New. Mat. Electrochem. Systems 6 (2003) 1-8) used chemical reduction to deposit platinum on fullerenes and applied a similar method to deposit platinum on carbon black. With this system, the authors demonstrated that they obtained electrochemical performances with fullerenes as the platinum support that were inferior to those obtained with carbon black.

Thus, it can be seen in the prior art that, while the use of fullerenes had already been suggested in the context of research on new catalysts for electrochemical apparatuses, the results obtained were not very encouraging.

The present invention is part of the research for new technical solutions for catalysts designed for electrochemical apparatuses, notably PEMFC cells and PEM electrolysers.

On another hand, improving the lifetime of PEMFCs is a major challenge for the use and development of fuel cells for the consumer market. That is why it is essential today to demonstrate and understand the aging phenomena affecting cell cores.

In this context, many scientific studies have shown that aging in fuel cells is, amongst other things, associated with changes in the nano/microstructural properties of the active catalytic layer. It has notably been observed that there is a sharp decrease in the thickness of the active layer on the cathode after a few hours of operation.

This breakdown is due to corrosion on the carbon catalytic support in keeping with the following reaction:

$$C + 2H_2O \rightleftarrows CO_2 + 4H^+ + 4e^- \qquad (1)$$

The potential of this reaction (1) is approximately 0.2 V/SHE. Given that the cathode potential of a fuel cell is usually greater than 0.2 V, this reaction always takes place. Furthermore, the constant presence of a large quantity of water produced by the recombination of the protons with the oxygen in the cathode encourages the reaction (1).

Moreover, corrosion of the carbon in the cathode catalytic layer 4 is accentuated by the proton pump effect due to the presence of oxygen on anode 3, as described by A. A. Franco and M. Gerard (J. Electrochem. Soc. 155 (4) (2008) B367-B384). The reaction (1) then shifts sharply to the right:

$$C + 2H_2O \rightleftarrows CO_2 + 4H^+ + 4e^-$$

Furthermore, damage to the cathode carbon support causes a loss of catalytic surface and an increase in the contact resistance between the cathode 4 and the gas diffusion layer 8. This contributes to reduced PEMFC durability.

Other additional approaches have been envisaged to attempt to reduce or eliminate carbon corrosion on the cathode 4.

Firstly, certain methods consist in acting directly on the carbon support:

It has been proposed to use more corrosion-resistant carbon supports such as carbon nanotubes or fullerenes. Applying heat treatment to the carbon support also improves its corrosion resistance.

One solution proposed for decreasing corrosion on the cathode carbon, described in document JP2006-278190, consists in adding carbon dioxide ($CO_2$) into the air (oxidising gas) in cathode 4 and controlling its quantity. By adding $CO_2$, the reaction (1) is shifted toward the left and carbon consumption/corrosion is therefore slowed:

A third possibility consists in adding carbon monoxide (CO) to the anode 3, in the combustible gas.

The oxygen present on the anode is normally reduced by the hydrogen in the anode compartment. During the start-up/shut-down, power cycle, water plug formation and hydrogen supply shut-down phases, however, there is not enough hydrogen to reduce the oxygen. During these phases, the oxygen still present uses other proton sources and notably those produce by oxidation of the cathode carbon. The oxygen present on the anode therefore acts as a proton pump which accentuates carbon corrosion on the cathode catalyst layer following the reaction:

Adding carbon monoxide (CO) to the anode 3 is a solution that reduces cathode carbon corrosion. Indeed, by reacting with the $O_2$ present in the anode, the CO reduces the "proton pump" effect. The presence of a small amount of CO in the hydrogen therefore has a beneficial effect on cathode carbon corrosion, as reported by A. A. Franco et al. (*Electrochimica Acta*, 54 (22) (2009) 5267-5279).

S. Takenaka et al. (*J. Electrochem. Soc.*, 155 (9) (2008) B929-B936) also proposed a very different approach.

The aim is to implement a non-conducting (insulating) silica-based ($SiO_2$) protective layer on a carbon/platinum nanotube group. The purpose of this layer is to limit the migration of platinum and therefore the formation of catalytic particle aggregates responsible for a drop in the fuel cell's performances. This solution thus acts on the catalyst's stability, but not on the carbon nanotubes considered by the authors as having good stability against carbon corrosion. Furthermore, the $SiO_2$ layer is placed on the entire carbon nanotube/platinum system by hydrolyzing compounds (3-aminopropyl-triethoxysilane and tetraethoxysilane) that are first mixed with the entire carbon nanotube/platinum system.

The present invention is part of the research for new technical solutions for reducing corrosion of the carbon on the cathode in electrochemical reactors such as PEMFCs.

DISCLOSURE OF THE INVENTION

A first aspect of the invention concerns the improvement of the electrochemical properties of an active layer for an electrolytic reactor, using fullerenes combined with a metal as a catalytic system.

Thus, according to a first embodiment, the present invention concerns an active layer for an electrochemical apparatus including a catalyst system mixed with a carbon electronic conductor, said catalyst system including a metal or several metals combined with at least one fullerene.

While it was known in the prior art that a metal catalyst and carbon black or alternatively a metal catalyst and a fullerene, possibly in the form of a metallofullerene, could be mixed together, the present invention proposes using fullerenes in a fullerene-based catalytic system mixed with a carbon electronic conductor other than a fullerene. This catalytic system is mixed with a conventional carbon electronic conductor such as carbon black.

This is surprising in that fullerenes alone and carbon black alone are inert in terms of electrochemical reactions.

In the context of the invention, it is advantageous for the catalyst to be a metal or a mixture of metals conventionally used in the context of catalytic layers for electrochemical apparatuses. Such metals are advantageously chosen from the group including platinum (Pt) and palladium (Pd). Platinum has been advantageously selected.

As indicated above, an active layer according to the invention includes, beyond the catalytic system, a carbon electronic conductor. To differentiate this further from the prior art, this carbon electronic conductor is not a fullerene.

It may be carbon black, for example. In the context of the invention, "carbon black" means a colloidal carbon material in the form of carbon aggregates and agglomerates of these aggregates. This may include Vulcan® or Shawinigan® products, for example.

Alternatively, the carbon electronic conductor may comprise or include carbon nanowires, carbon nanofibers, carbon nanotubes, carbon nano-onions, graphite or polymers such as polyaniline or polypyrole.

Fullerenes are therefore combined in a known manner with metal or metals, forming the catalytic system made up of doped fullerenes. In the context of the present invention, doped fullerenes can mean:

metallofullerenes, i.e. the case in which the metal is coupled with the fullerene through a chemical bond or when it is located in the carbon cage;
  the metallic catalyst deposited on the fullerenes, as conventionally done with carbon black and as described, for example, in the document by Pinheiro et al. (J. New. Mat. Electrochem. Systems 6 (2003) 1-8).

In this last case, the metallic catalyst comprising one or more metals is advantageously deposited on the fullerene(s) up to 5 to 60% by mass, advantageously 20% by mass of the metal(s) compared with the mass of the fullerene(s).

It should be pointed out that the fullerenes used in the present invention may receive a varied load of metal, notably including one or more metal atoms per fullerene molecule. It may also be a mixture of different fullerenes.

According to an advantageous embodiment, the carbon electronic conductor accounts for 5 to 50% by mass of the mixture made up of the catalytic system and the carbon electronic conductor, advantageously 20 to 30% and even more advantageously 25%.

According to another embodiment of the invention, this also concerns the method of producing an active layer as described above.

A first step consists in combining the metal(s) with the fullerene, then mixing the catalytic system thus obtained with the carbon electronic conductor. Two situations can then occur:
- the carbon electronic conductor, notably carbon black, is mixed with a metallofullerene;
- the carbon electronic conductor, notably carbon black, is mixed with a fullerene, on which the catalyst had previously been deposited, advantageously by chemical reduction as described in the document by Pinheiro et al. (J. New. Mat. Electrochem. Systems 6 (2003) 1-8).

The second step consists in producing the active layer itself. For this, the mixture obtained in the previous step (doped fullerene+carbon electronic conductor, notably carbon black), for example 20 mg, is formulated with a hydroalcoholic mixture (for example 200 µl deionised water and 600 µl isopropyl alcohol) and a polymer such as Nafion® (172 mg Nafion® solution at a concentration of 5% by mass). The ink thus obtained is deposited using methods that are known to persons skilled in the art (spraying, pipette deposits, etc.).

The invention also concerns any electrochemical reactor or apparatus including an active or catalytic layer as defined previously, such as fuel cells (acid or basic) and low-temperature electrolysers of the PEM type.

A second aspect of the invention concerns the improvement of the stability and durability of an active layer for an electrolytic reactor, using fullerenes.

The present application proposes a brand new approach consisting in protecting the carbon support so as to limit its contact with water and, consequently, its corrosion.

Ideally, if the water is eliminated during the reaction (1), carbon corrosion is halted.

In practice, it is a question of applying a protective layer that is more hydrophobic than the carbon support, but electronically conductive, between the catalytic sites and the carbon support. This protective layer is deposited locally in a closely controlled manner. Only the carbon particles are coated, with the protective layer forming a sort of sheath around the carbon grains, without modifying the catalyst particles or grains.

In other words, the present application concerns an active layer for electrochemical reactors, traditionally including a catalyst and a carbon black-based carbon support. Characteristically, according to the invention, said carbon support is fully or partially coated with a material that is more hydrophobic than the carbon support and is electronically conductive.

Conventionally, the catalyst is a metal or a mixture of metals (alloy), advantageously chosen from the group including platinum (Pt) and palladium (Pd). Alternatively, it could be a metallofullerene doped with one of these same metals.

In the context of the invention, the catalyst may be in the form of particles, advantageously nanometric in size, or in the form of a layer. This notably depends on the nature of the hydrophobic and electronic conductor material and electronic upon which said catalyst is deposited, and on the technique used for this deposit.

A carbon black support is used as the carbon support. "Carbon black" is a colloidal carbon material in the form of carbon aggregates and agglomerates of these aggregates. Vulcan® products can be used, for example, as they are traditionally applied to fuel cells.

In the context of the invention, this carbon support has an affinity with water, which leads to its deterioration as described above. By definition, the support thus has less hydrophobicity than the hydrophobic, electronically conductive material used to coat it.

The new component in the active layer according to the invention comprises a material that is more hydrophobic than the carbon support, while being electronically conductive. It therefore plays the essential role of protecting the carbon support from water by constituting a physical barrier and exercising a water repellent effect.

This material is designed to coat the carbon support partially or fully. It can be deposited continuously on the support, forming a layer that partially or fully covers the surface of the support. Alternatively, it can be deposited in the form of particles on the surface of the support (on the entire surface or on part of the surface).

In any case, the catalyst is essentially deposited on the surface of the hydrophobic, electronically conductive material, and not directly on the surface of the carbon support as was the case in the prior art.

Other than its hydrophobic aspect, and unlike the prior art which called for the use of an insulating material such as silica, this material is characterised by its property as an electronic conductor, which is indispensable in the context of its use in the active layer of an electrochemical reactor or fuel cell. Moreover, in the invention, the protective layer does not cover the catalyst.

According to a first embodiment, said material is polymeric in nature and advantageously has the form of a layer. In the particular case of a polymer layer, said layer is deposited so as to form a film around the carbon particles.

In practice, a method adapted to the elaboration of such a catalytic system, for example, includes the following steps:
- mixing carbon particles with a solution containing said polymer;
- evaporating the solvent present in the polymeric solution.

This method results in the carbon particles being protected by a protective film. In fact, in this first embodiment, the polymer layer coats all the carbon particles. The catalyst particles are then deposited on the protective layer. Various techniques that are well known to the person skilled in the art can be used for this, such as electrodeposition, CVD ("Chemical Vapour Deposition"), etc.

The polymers that can be used in this invention include, for example, polyaniline or polypyrole. These two polymers have the property of being more hydrophobic than carbon black as well as being electronically conductive.

According to a second embodiment, the material that is more hydrophobic than the carbon black and electronically conductive is fullerene-based. It may be a simple (non functionalised) fullerene, a functionalised fullerene (e. g. bearing at least one carbonated chain) but preferably bearing no proton affinity group, a metallofullerene or a mixture thereof.

In fact, given their highly hydrophobic character, fullerenes, which are an allotropic variety of carbon, can constitute a protective layer on the carbon support, such as carbon black, while providing electronic conduction.

In a first case, the fullerenes themselves serve as the protective layer for the carbon support and the catalyst is then deposited on the fullerene layer. The catalyst can be in the form of nanoparticles or in the form of nanometric metallic layers.

A method adapted to the elaboration of this catalytic system, for example, includes the following steps:
preparing an ink comprising the carbon support, advantageously carbon black, and the fullerenes;
depositing the metallic catalyst particles.

If the catalyst is in the form of nanoparticles, the deposit is preferably produced by electrodeposition or by chemical reduction.

If the catalyst is in the form of a nanometric metallic layer, the deposit is preferably produced using a method of the MOCVD type ("Metal Organic Chemical Vapour Deposition").

Alternatively, the fullerenes can be applied in doped form, also called metallofullerenes. In this embodiment, the metal (one or more atoms per fullerene molecule, possibly with different metals) serving as a catalyst is actually integrated into the fullerene through a chemical bond or through its location in the carbon cage. The fullerene-metal set is what is deposited on the carbon particles constituting the carbon support.

It should be pointed out that even if the system [fullerene-metal] (metallofullerene) has catalytic properties that are different from those of the system [metal deposited on the fullerene layer], the hydrophobic and conductive properties of the doped fullerenes are preserved.

In this case, the doped fullerenes themselves constitute a protective layer for the carbon support, notably carbon black. They are also used to form the catalytic layers with weak platinum loads (less than 0.1 mg Pt/cm$^2$). As these doped metallofullerenes have very good stability, breakdown at the catalyst sites is sharply reduced.

According to another aspect, the invention also concerns an electrochemical reactor such as a fuel cell, notably of the PEMFC type, comprising an active or catalytic layer as defined above.

In the frame of the present invention, it was shown that a same technical solution solves two technical problems:
improving the electrochemical performances of electrochemical reactors; and
reducing the corrosion phenomenon on the carbon catalyst support, specially carbon black, that occurs on the cathode of such reactors.

Said technical solution consists in an active layer for an electrochemical reactor comprising:
a carbon electronic conductor which is not a fullerene as a support; and
a catalytic system made up of one or more metals and a fullerene.

In a preferred embodiment, the fullerene has no proton affinity group.

In a still preferred embodiment, the fullerene is a non functionalised (simple) fullerene or a metallofullerene.

In case of fullerene, said fullerene has preferentially no proton affinity group, i. e. no negatively charged group like hydroxyl group ($OH^-$), carboxyl group ($COO^-$) or sulfonic acid group ($SO_3^-$).

In case of a metallofullerene, the catalytic system can be made up of said metallofullerene. Alternatively, a catalyst is deposited on said metallofullerene to constitute the catalytic system.

More generally, the one or more metals can be deposited on the fullerene to constitute the catalytic system. According to this embodiment, the one or more metals can be in the form of particles, advantageously of nanometric size, or in the form of a layer.

The carbon electronic conductor is advantageously carbon black.

According to another embodiment, especially to improve the electrochemical performances, the support is mixed with the catalytic system. In this case, both are preferably powders.

According to a preferred embodiment, the carbon electronic conductor accounts for 5 to 50% by mass, advantageously between 20 and 30%, of the whole (the carbon electronic conductor and the catalytic system).

Alternatively, the support can be fully or partially coated with the catalytic system.

Typically, the one or more metals is chosen from the group including platinum (Pt) and palladium (Pd).

The invention also concerns any electrochemical reactor, notably a fuel cell or electrolyser, including an active layer as described above.

BRIEF DESCRIPTION OF THE FIGURES

How the invention is implemented and the resulting advantages can be better understood with the following example of an embodiment, which is given for informational purposes and is not limiting, as illustrated by the appended figures, including:

FIG. 6 represents a first embodiment based on the use of a hydrophobic, electronically conductive polymer as a protective layer for the carbon support: cross-section diagram (A) and electron microscope cross-section view (B).

FIG. 7 represents a second embodiment based on the use of fullerenes as the protective layer for the carbon support, the catalyst being deposited in the form of particles (cross-section diagram (A)) or in the form of a layer (cross-section diagram (B)).

FIG. 9 illustrates the potential of the cell (A) and the carbon loss (B) in case of carbon black protected by metallofullerenes in comparison with $SO_3^-$-functionalized-fullerenes.

EMBODIMENTS OF THE INVENTION

I/Improvement of Electrochemical Performances:

The present invention will be further illustrated in relation to acid PEFC fuel cells.

I-1—Support=Carbon Black:

The mixture of doped fullerene and carbon black powders was dispersed in ink in the same way as the doped fullerenes alone or the metal supported by the carbon black. The inks were produced by adding the following substances to 20 mg of mixture:
- 200 μl deionised water;
- 600 μl isopropyl alcohol;
- 172 mg Nafion® solution at a concentration of 5% by mass.

The inks were then dispersed for several hours in an ultrasound bath, then deposited using a micropipette, for example, or by spraying.

Example 1

Using Fullerenes Doped with Metallic Platinum (Metallofullerene)

A first embodiment consists in using $Pt_4C_{60}$ metallofullerenes (a compound made up of 4 Pt atoms bound to a $C_{60}$ fullerene molecule) mixed with 25% carbon black.

Figure 3:
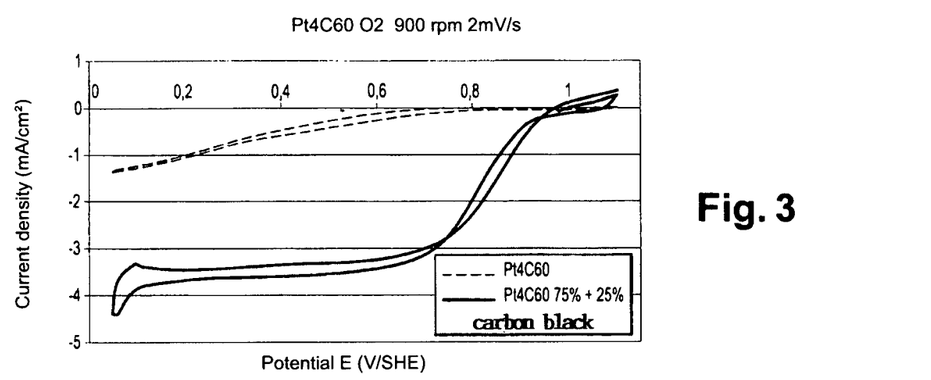
FIG. 3 illustrates the improvement in the electrochemical performances of $Pt_4C_{60}$ metallofullerenes in oxygen reduction on a rotating electrode.

The results of these experiments, illustrated in FIG. 3, were compared with those obtained at the laboratory with [platinum-fullerene] pure ($Pt_4C_{60}$ without carbon black).

It can be observed, for example, that at 0.6 V/SHE, adding carbon black improves oxygen reduction: the current density goes from −0.12 mA/cm$^2$ (without carbon black) to −3.22 mA/cm$^2$ (with 25% carbon black).

Example 2

Using Fullerenes Doped with Metallic Palladium (Metallofullerene)

A second embodiment consists in using $Pd_{10}C_{60}$ metallofullerenes (a compound made up of 10 Pd atoms bound to a $C_{60}$ fullerene molecule) mixed with 25% and 75% carbon black, respectively. The results of these experiments, illustrated in FIG. 4, were compared with those obtained at the laboratory with [palladium-fullerene] pure ($Pd_{10}C_{60}$ without carbon black).

Figure 4:
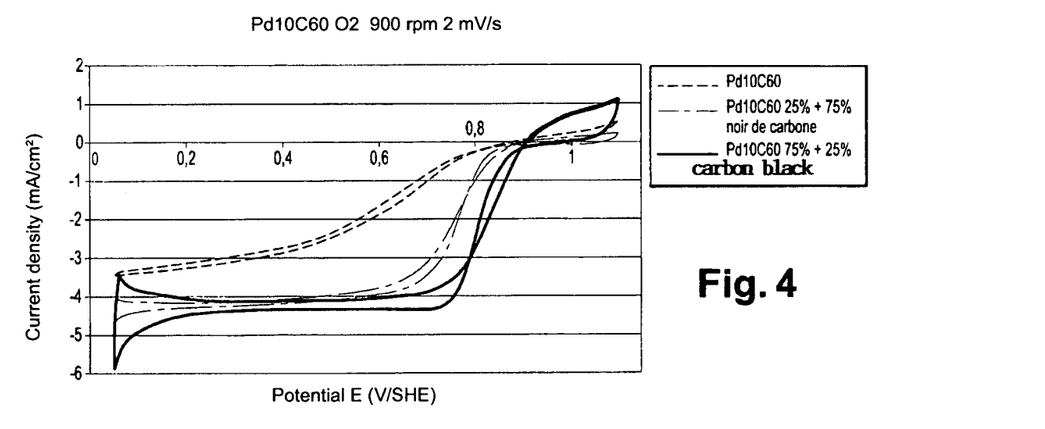
FIG. 4 illustrates the improvement in the electrochemical performances of $Pd_{10}C_{60}$ metallofullerenes in oxygen reduction on a rotating electrode.

It can be observed, for example, that at 0.6 V/SHE, adding carbon black improves oxygen reduction: the current density goes from −1.68 mA/cm$^2$ (without carbon black) to −3.81 mA/cm$^2$ (with 75% carbon black) and −4.05 mA/cm$^2$ (with 25% carbon black).

Example 3

Use of Chemically Reduced Metallic Platinum on the Fullerenes

A third embodiment consists in using chemically reduced platinum on fullerenes following the protocol described by Pinheiro et al. (J. New. Mat. Electrochem. Systems 6 (2003) 1-8). In practice, nanoparticles of platinum are deposited on fullerene aggregates to 20% platinum by mass. This catalytic system is mixed with 25% carbon black. Once again, the two tests were performed in parallel on a rotating electrode. The corresponding results are given in FIG. 5.

Figure 5:
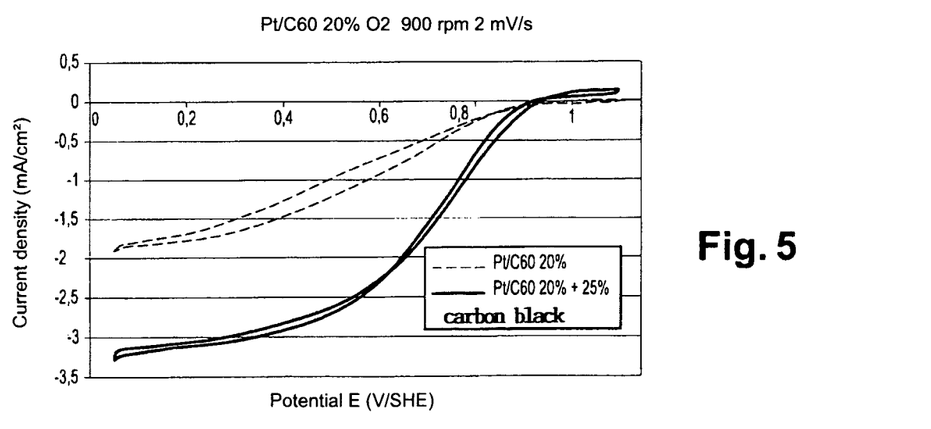
FIG. 5 illustrates the improvement in the electrochemical performances of reduced platinum (20%) on fullerenes in oxygen reduction on a rotating electrode.

It can be observed, for example, that at 0.6 V/SHE, adding carbon black improves oxygen reduction: the current density goes from −0.70 mA/cm$^2$ (without carbon black) to −2.28 mA/cm$^2$ (with 25% carbon black).

As these examples illustrate, a proportion of 5 to 50% carbon black on the total mass of the doped fullerene–carbon black mixture significantly improves electrochemical performances on the anode and on the cathode. In most cases, the optimum proportion is approximately 25% carbon black.

I-2—Support=Other Carbon Electronic Conductors:

Improvement of electrochemical performances was validated for other carbon electronic conductors as supports, i. e.:
- carbon nanofibers;
- graphite;
- carbon nanotubes.

II/Reduction of Carbon Loss:

II-1—Protection=Polymers:

A fuel cell of the PEMFC type comprises an MEA 1 having a 2-cm$^2$ active surface in carbon black with, as a catalyst, platinum (Pt) in the form of nanoparticles that are 2 nm in diameter, deposited by chemical reduction. The final Pt load is 0.5 mg/cm$^2$.

The fuel cell is supplied with pure hydrogen and oxygen, operating at 1.5 bar at anode 3 ($H_2$) and cathode 4 ($O_2$), at 80° C., 100% RH.

A 0.5 A/cm$^2$ direct current is applied.

With no particular protection on the carbon support, the average lifetime observed for the fuel cell is 800 hours.

Figure 6A:
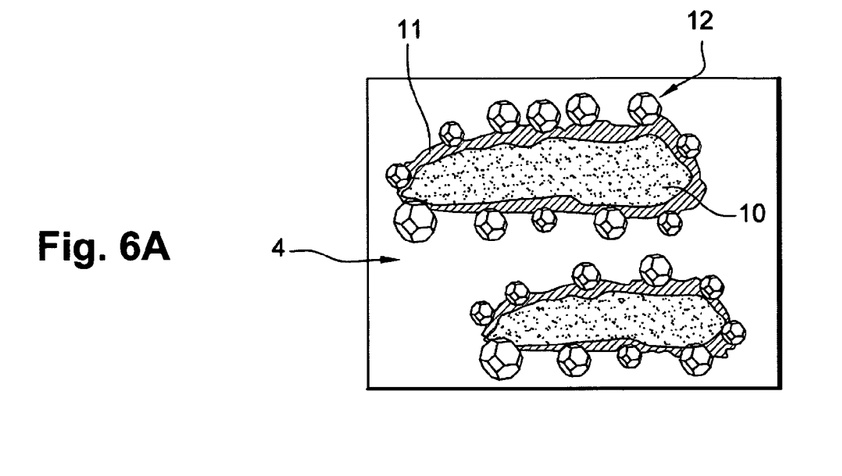
Figure 6B:
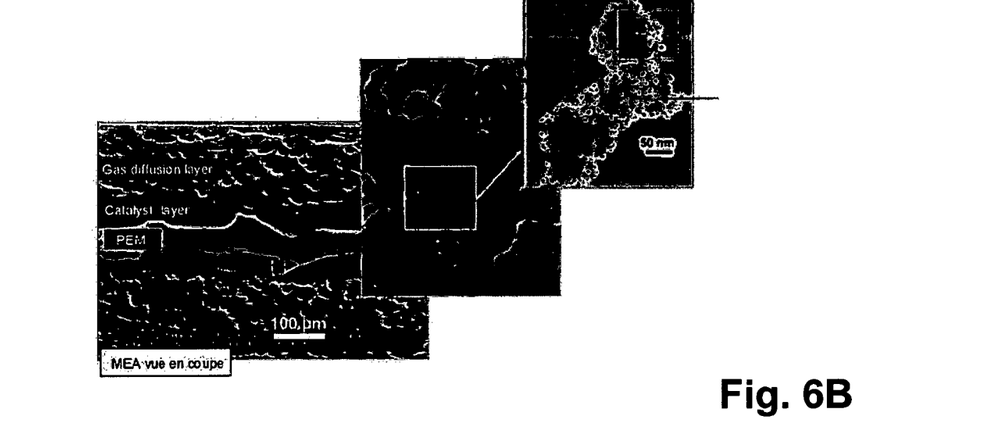

When the carbon is protected by a 100-nm hydrophobic, electronically conductive layer of polyaniline (FIG. 6), the lifetime is increased by at least 400 hours, i.e. an increase of at least 50%. Carbon loss is reduced by 30% compared with the loss with a conventional layer.

In practice, the polyaniline and the carbon black are mixed in a solvent. During polymerisation, the polyaniline coats the grains of carbon.

Figure 7A:
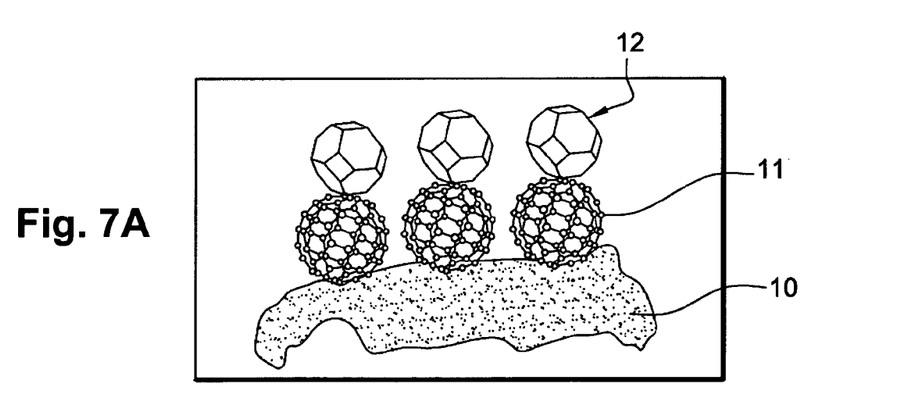
Figure 7B:
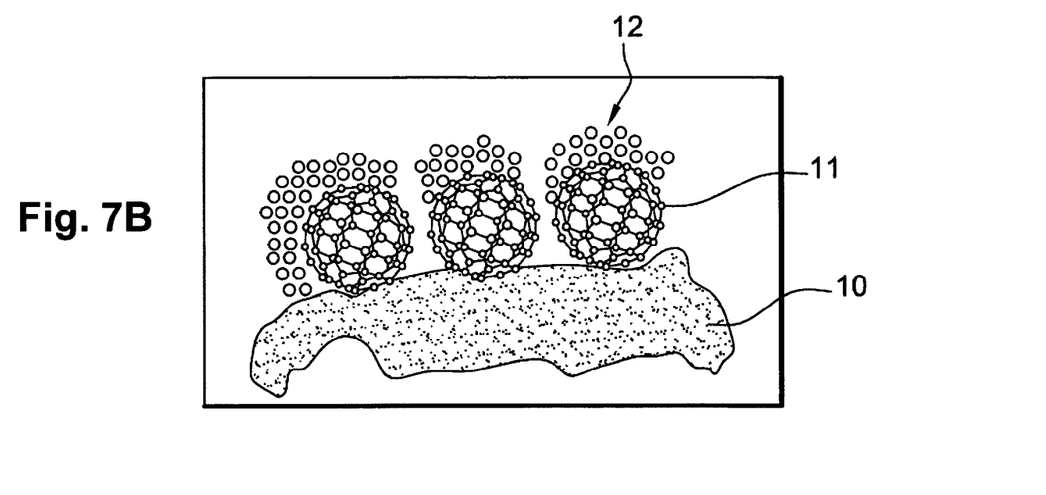
Figure 8:
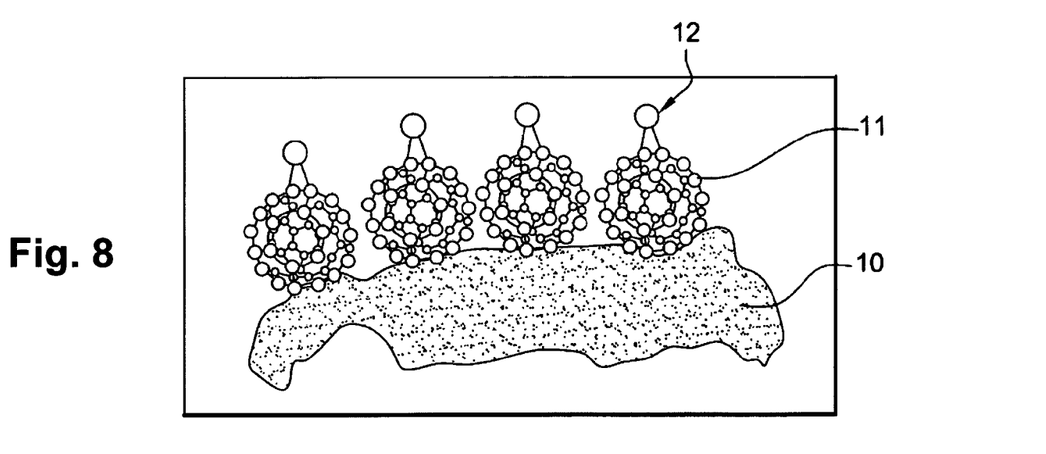
FIG. 8 represents a cross-section diagram of a third embodiment based on the use of doped fullerenes, the doped fullerenes playing the role of a protective layer for the carbon support and the catalyst system.

II-2—Protection=Fullerenes:

The protection of carbon by fullerenes is shown on FIGS. 7 and 8.

Moreover, a comparison was made between:
- carbon black+metallofullerenes (Pt-metallofullerenes); and
- carbon black+fullerenes functionalized with a sulfonic acid group ($SO_3^-$); i.e. a proton affinity group ($SO_3^-$-functionalized-fullerenes).

Figure 9A:
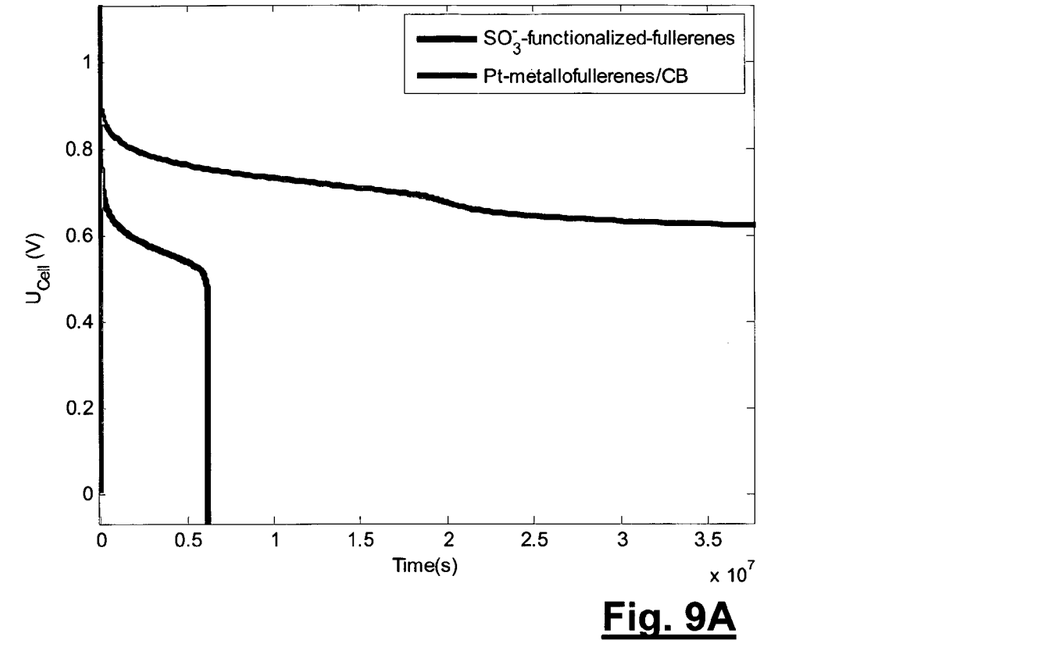

FIG. 9A reveals that the potential of the cell is higher and more stable over time with the system according to the invention (metallofullerenes). Consequently, the durability and lifetime are increased.

Figure 9B:
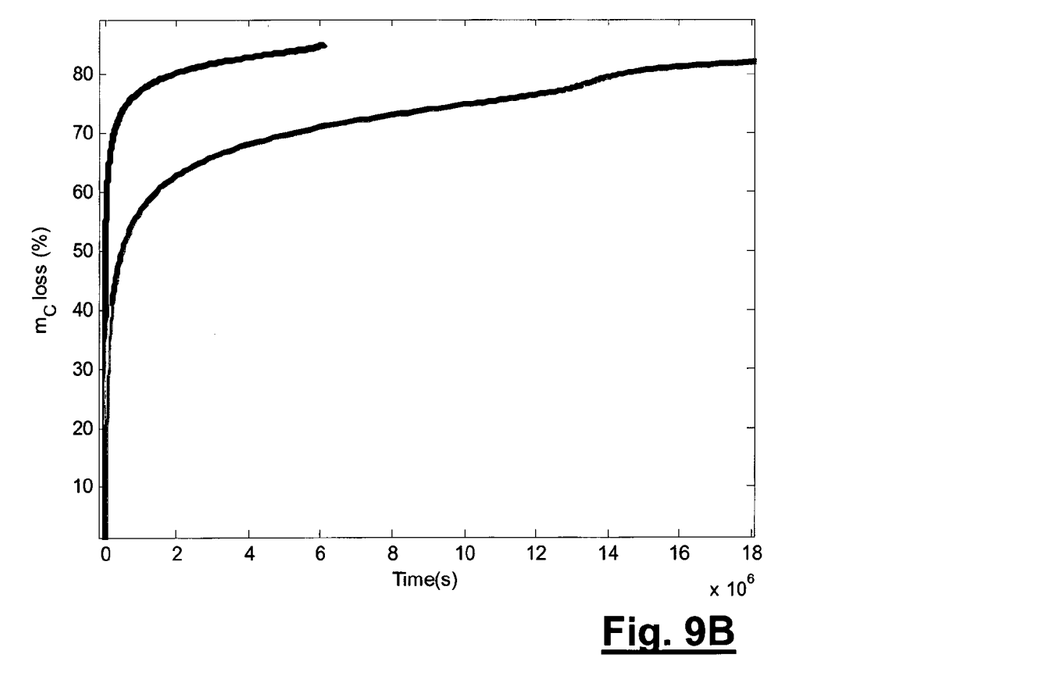

FIG. 9B shows the carbon loss (% loss of carbon black) associated with both systems.

These results demonstrate that, as a consequence of reduced corrosion of carbon black, the combination of carbon black with metallofullerenes or non functionalized fullerenes offers improved durability (potential more stable over time) and electrochemical performances (higher potential).

A sample of the active layers that are described herein are set forth in the following numbered paragraphs.

1. Active layer (4) for an electrochemical reactor comprising a catalyst (12) and a carbon support (10) in carbon black, said carbon support (10) being fully or partially coated with a material (11) that is more hydrophobic than the carbon support and is electronically conductive.

2. Active layer for an electrochemical reactor as described in paragraph no. 1 above, characterised in that the catalyst (12) is a metal or a mixture of metals, advantageously chosen from the group including platinum (Pt) and palladium (Pd).

3. Active layer for an electrochemical reactor as described in paragraph no. 1 above, characterised in that the catalyst (12) is a metallofullerene whose metal is advantageously chosen from the group including platinum (Pt) and palladium (Pd).

4. Active layer for an electrochemical reactor as described in paragraph nos. 1, 2 or 3 above, characterised in that the catalyst (12) is in the form of particles, advantageously of nanometric size.

5. Active layer for an electrochemical reactor as described in paragraph nos. 1, 2 or 3 above, characterised in that the catalyst (12) is in the form of a layer.

6. Active layer for an electrochemical reactor as described in any of paragraph nos. 1 to 5 above, characterised in that the material (11) that is more hydrophobic than the carbon support and is electronically conductive is fullerene based.

The invention claimed is:

1. An electrochemical reactor comprising an active layer, the active layer comprising:
 a support consisting of carbon black; and
 a catalytic system, wherein the catalytic system comprises:
  at least one metal and a non-functionalized fullerene, wherein the non-functionalized fullerene does not comprise a proton affinity group, wherein the at least one metal is platinum (Pt) or palladium (Pd), and wherein the at least one metal is deposited on the fullerene, or
  a metallofullerene, wherein the metallofullerene does not comprise a proton affinity group, and wherein metallofullerene comprises Pt or Pd,
 wherein the support is mixed with the catalytic system, or wherein the support is fully or partially coated with the catalytic system.

2. The electrochemical reactor of claim 1, wherein the electrochemical reactor is a fuel cell or an electrolyzer.

3. The electrochemical reactor of claim 1, wherein the at least one metal is in the form of particles.

4. The electrochemical reactor of claim 1, wherein the at least one metal is in the form of a layer.

5. The electrochemical reactor of claim 1, wherein the support accounts for 5 to 50% by mass of the support and the catalytic system.

6. The electrochemical reactor of claim 4, wherein the support accounts for 5 to 50% by mass of the support and the catalytic system.

7. The electrochemical reactor of claim 3, wherein the particles are nanometric-sized particles.

8. The electrochemical reactor of claim 5, wherein the support accounts for 20 and 30% by mass of the support and the catalytic system.

9. The electrochemical reactor of claim 6, wherein the support accounts for 20 to 30% by mass of the support and the catalytic system.

* * * * *